June 1, 1937.  F. C. LEONARD  2,081,938
VALVE CONSTRUCTION
Filed June 30, 1933
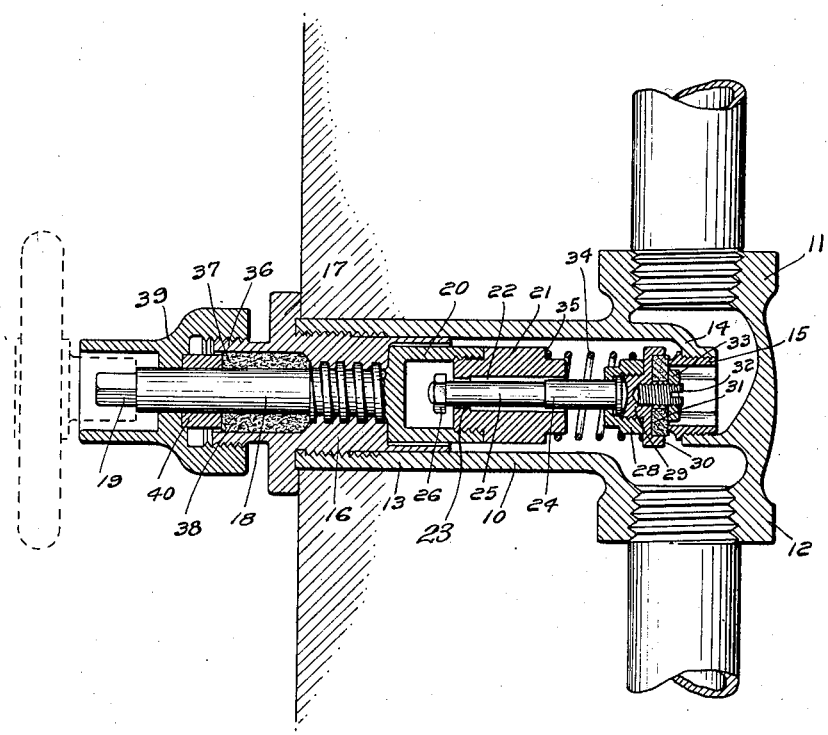
Inventor
Frederick C. Leonard
By Nathaniel Frucht
his Attorney Patented June 1, 1937

2,081,938

UNITED STATES PATENT OFFICE 2,081,938

VALVE CONSTRUCTION

Frederick C. Leonard, Cranston, R. I.

Application June 30, 1933, Serial No. 678,498

4 Claims. (Cl. 251—141)

My present invention relates to valves, and has particular reference to a loose key stop and check valve arrangement.

It has been found desirable to provide a loose key stop and a check valve in installations for fluid control, this form being especially advantageous in installations utilizing thermostatic control valves. The preferred construction is to seal the check valve permanently in the wall of the room or building, but such sealing renders it extremely difficult and in practice impossible to reseat the check valve, particularly if a vertical check or a semihorizontal swing check is utilized.

It is the principal object of my invention to provide an arrangement of loose key stop and check valve which may be permanently sealed in a wall, and which may be readily repaired or reseated when desired. To this end, I have devised a novel arrangement having a loose key stop which may be turned to close off the fluid supply in the usual manner, and provided with a spring check which functions when the key stop is in open position, the entire mechanism being readily removable for repairs.

With the above and other objects and advantageous features in view, the invention consists of a novel arrangement of parts more fully disclosed in the detailed description following, in conjunction with the accompanying drawing, and more specifically defined in the claims appended thereto.

In the drawing, the figure represents the novel valve arrangement in section, with the check valve in operative position.

Referring to the drawing, the novel arrangement includes a body member 10 of generally T formation, having lateral inlet and outlet pipe nipples 11, 12 which are preferably in alignment, and an upstanding portion 13 threaded at the open end to receive the operating mechanism. The body member is formed with an integral seat retaining member 14 in which a valve seat 15 is removably positioned, as by threaded connections.

The operating mechanism includes a support 16 which is threaded to engage the threads of the portion 13, the support having a flange 17 which is recessed to lock over the end of the portion 13, and being internally threaded to receive the correspondingly threaded valve stem 18 which has a hexagonal end key 19 at the outer end and a sleeve 20 at the inner end, the sleeve 20 being internally threaded to receive a block member 21 having a central bore 22 terminating in a central opening 23.

A rod 24 is positioned in the bore 22, and has an upper portion 25 extending through the opening 23 and threaded to receive a retaining nut 26, the lower end 24 being of greater diameter to more closely fit the bore 22 and terminating in a loose fit with cup 28 which is internally threaded to receive the end 29 of a valve head 30. Packing 31 is removably retained within the valve head 30, as by the usual threaded stud 32 and lock nut 33. The packing 31 is adapted to engage the seat 15, as illustrated, in leak proof contact. A helical spring 34 is seated to engage the retainer 30 at the lower end, and the block member 21 at the upper end, the block member being recessed as at 35 to provide the necessary spring seat.

Referring now to the support 16, the support has an upstanding tubular portion 36 which is spaced from the valve stem to provide a chamber 37 for receiving packing 38, and is externally threaded to receive a cap 39 which has a packing press 40 adapted to engage and force the packing 38 into sealing contact with the valve stem; the cap 39 and press 40 have central openings to accommodate the upper end of the valve stem 18, and the cap is recessed to receive the end of a valve key, as indicated in dotted lines.

The operation of the novel arrangement is readily apparent; the inlet and outlet nipples are connected in the flow line, and the body portion extends to the wall, thus permitting assembly and removal of the operating mechanism as a unit. The packing and other parts may be readily changed, and the seat may be cleaned or replaced, if necessary, without disturbing the mounting. When the valve stem is turned to closing position, the sleeve 20 engages the end of the rod 25, and presses the rod and the valve head against the valve seat; when the valve stem is turned to open position, the rod, valve head and spring function as a spring pressed check valve.

While I have described a specific structural embodiment of my invention, changes in the size, in the relative proportions, and in the arrangement of the parts, may be made as appear desirable to suit the requirements for different types of installations, within the spirit and the scope of the appended claims.

I claim:—

1. In combination, a body member having a valve seat, a valve head operating mechanism removably mounted in said body member comprising a support having a threaded bore, a valve stem in said bore having threads cooperating with the bore threads, a sleeve at the end of said valve stem, a block member of solid construction detachably secured to said sleeve and having a longitudinal bore extending from one end thereof to the other, a valve rod slidable in said bore and guided therein and having a retainer device at the sleeve end and a valve head at the other end adapted to engage said valve seat, and a compression spring respectively engaging said block member and said valve head for resiliently urging said valve head towards said valve seat.

2. In combination, a body member having a valve seat, and valve head operating mechanism removably mounted in said body member comprising a support, a valve stem threadedly engaging said support and having a depending sleeve, a block closure member of solid construction threadedly secured to said sleeve and having a longitudinal bore extending from one end thereof to the other and a spring seat at the lower end thereof, a valve rod slidable in said bore and guided therein and having a valve head engageable with said valve seat, said valve rod having a spring seat adjacent said valve head, and a compression spring seated on said valve rod and engaging the spring seats of the block closure member and the valve rod.

3. In combination, a body member having a valve seat, and valve head operating mechanism removably mounted in said body member comprising a support having a threaded bore, a valve stem in said bore having threads cooperating with the bore threads, a sleeve at the end of said valve stem, a block member of solid construction detachably secured to said sleeve and having a longitudinal bore extending from one end thereof to the other, a valve rod slidable in said bore and guided therein and having a retainer device at the sleeve end, a valve head adapted to engage said valve seat, means movably mounting the valve head on the valve rod, and a compression spring respectively engaging said block member and said valve head for resiliently urging said valve head towards said valve seat.

4. In combination, a body member having a valve seat, and valve head operating mechanism removably mounted in said body member comprising a support, a valve stem threadedly engaging said support and having a depending sleeve, a block closure member of solid construction threadedly secured to said sleeve and having a longitudinal bore extending from one end thereof to the other and a spring seat at the lower end thereof, a valve rod slidable in said bore and guided therein and having a valve head movably mounted thereon and engageable with said valve seat, said valve rod having a spring seat adjacent said valve head and a compression spring seated on said valve rod and engaging the spring seats of the block closure member and the valve rod.

FREDERICK C. LEONARD.